Patented June 17, 1941

2,245,721

UNITED STATES PATENT OFFICE 2,245,721

ORGANIC REACTIONS IN SULPHUR DIOXIDE

John Ross, Robert Louis Brandt, and Joseph Henry Percy, New York, N. Y., assignors to Colgate-Palmolive-Peet Company, Jersey City, N. J., a corporation of Delaware No Drawing. Application July 26, 1938, Serial No. 221,352

11 Claims. (Cl. 260—476)

This invention relates to a method of preparing organic compounds, and more particularly to a method of controlling catalyzed reactions of organic compounds.

Many methods have been devised and described for bringing about the interaction of organic compounds and in almost all cases the need has been recognized for controlling the reactions. If the compounds are permitted to react under most conditions in which reaction takes place, usually many combinations are possible, and products represented by such possibilities are produced. These possibilities are complicated by the use of catalysts, which take part in reactions in a manner which is little understood.

Also, many reactions of organic compounds are exothermic, and as the action proceeds the temperature of the reacting mass increases, thus promoting undesirable reactions in the heated condition.

Consequently, a great need has long been recognized for an effective method of greater control over the rate, direction, and other variables, of reactions, and especially those which are influenced by catalysts. Many ways have been suggested to effect this control, and some have given a measure of success, as is the case with the use of proposed solvents for the reactants, but each solvent has introduced new difficulties and limitations. One common disadvantage of these solvents has been their tendency to enter into the reaction, thus further complicating the process and rendering the production of pure products increasingly difficult. Many liquids suggested as solvents do not dissolve both of the reactants, or fail to dissolve the catalysts. This results in a decided impediment to bringing the reactants into intimate contact, thus both reducing desirable reaction and increasing local activity, resulting in an uneven temperature throughout the mass. Such conditions are difficult to control by outside means.

Other objections to solvents heretofore proposed include the difficulty of removing them from the final product, due to being only slightly soluble in water, volatile with difficulty, etc.; the inflammability of some which renders their utility in commercial processes extremely hazardous and uneconomical; and insolubility therein of any intermediate products formed during the reaction. Other objections pertain to individual solvents.

Having in mind the defects, shortcomings and hazards of the prior art methods, it is an object of our invention to provide a novel and improved method for controlling organic reactions. Another object is to provide a method of controlling the rate of reactions in which catalysts are employed. Another object is to provide a method of more easily purifying products produced in these reactions. A further object is to provide a procedure for controlling organic reactions which is easily adaptable to commercial or mass production. A still further object is to provide a method as contemplated which is safe from fire hazards. Additional objects will become apparent as the disclosures proceed and with understanding of the process.

According to our invention we dissolve the organic reactants in liquid sulphur dioxide, together or separately, with subsequent mixing, and dissolve the catalyst utilized in the same or one of the liquid sulphur dioxide solutions, or in a separate portion, and mix that portion with the one containing the dissolved reactants. This procedure of mixing the solutions, which may be in any order, may be accomplished in a very short time, say a few seconds, or may be regulated to require a long period of time, say several hours, depending upon the nature of the reactants, the object to be attained, the control to be exercised and other factors. Proportions of liquid sulphur dioxide to each or all reactants (including catalysts) may be varied within very wide limits, and the conditions, such as temperature, pressure, etc., may also intentionally vary within wide limits at all times. For instance, it may be desirable to preheat or precool the various solutions or solution before the reaction begins, or the pressure upon the system may be varied as desired.

Our invention is particularly valuable in the following types of reactions commonly known as the Friedel and Crafts reaction, although it is not limited thereto:

(A) The alkylation of aromatic compounds by reaction with alkyl halides (including alkyl compounds which contain more than one halogen in the molecule), or with olefins.

Examples of these reactions are:

$$R-CH=CH-R' + ArH + AlCl_3 \rightarrow RCH_2CH(R')Ar + AlCl_3$$

$$RCH_2X + ArH + AlCl_3 \rightarrow RCH_2Ar + HX + AlCl_3$$

(B) Polymerization, isomerization, condensation and cyclization of hydrocarbons and their derivatives, including saturated and unsaturated aliphatic, cyclic, alicyclic, aromatic and substituted aromatic hydrocarbons and many of their derivatives. A catalyst or mixture of catalysts is utilized in the processes.

Examples are:

The polymerization of diisoamylene catalyzed with aluminum chloride.

The isomerization of normal pentene to give isoamylene and trimethyl ethylene.

(C) Esterification, particularly of mono- or poly-hydroxy aromatic compounds preferably with aromatic or aliphatic carboxylic acid halides, including the halides of polycarboxylic acids.

Example:

$$y(RCOX) + Ar(OH)_y + AlCl_3 \rightarrow (RCOO)_yAr + yHX + AlCl_3$$

(D) The acylation of aromatic compounds by reaction with carboxylic acid halides or carboxylic acid anhydrides.

Example:

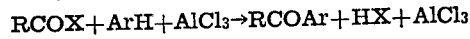
$$RCOX + ArH + AlCl_3 \rightarrow RCOAr + HX + AlCl_3$$

Although only aluminum chloride is given above as the catalyst, other metal halides, preferably in the anhydrous state, may be advantageously used, such as aluminum bromide, ferric chloride, zinc chloride, and other salts having a similar catalytic effect. The salts generally contain a plurality of halogen atoms in the molecule. Moreover, a mixture of two or more metal halides may be used more advantageously in some cases than a single salt.

In the above examples, which are illustrative only and in no sense limiting, R and R' may be hydrogen, hydrocarbon residues, or substituted hydrocarbon residues; Ar represents an aromatic radical which may or may not contain substituent groups; H is hydrogen; X is a halogen atom; and y is a small, whole number.

We have discovered that the disadvantages encountered with solvents heretofore known may be overcome by the use of liquid sulphur dioxide as the reaction solvent in processes of the types mentioned above. So far as we have been able to ascertain, this use of liquid sulphur dioxide is entirely novel. Among the advantages realized by the use of this solvent, the following are worthy of mentioned, though not exhaustive:

1. It is an excellent solvent for organic compounds, metal halides, and intermediates (such as organo-metallic complexes) involved in these reactions.

2. In general it is inert in the type reactions herein contemplated.

3. It facilitates the attainment of lower temperatures by virtue of its low boiling point.

4. Condensation reactions of the Friedel and Crafts type may be readily carried out in liquid sulphur dioxide with a minimum of undesirable side reactions.

5. Higher yields than heretofore achieved may be realized in many cases.

6. Temperature control can be readily achieved with liquid sulphur dioxide, due to the low boiling point, its ease of handling at low temperatures, good heat transfer, and other physical properties.

7. Greater ease in producing pure compounds therein.

8. Treatment of the final product with water when necessary and removal of the liquid sulphur dioxide may be done in one operation.

9. It is non-inflammable; thereby fire hazards are eliminated.

10. Removal of liquid sulphur dioxide from the reaction mixture is simple.

We have also found that certain metal halides, as referred to above, catalyze the reactions already outlined when liquid sulphur dioxide is employed as the reaction medium; thus these catalysts are effective under such conditions to bring about polymerization of olefins, polymerization of aromatics, alkylation of aromatics by olefins and by alkyl halides, preparation of ketones by acylation of aromatic hydrocarbons, aromatic ethers, and esters of hydroxy aromatic compounds, the preparation of alkylated phenols by the alkylation of phenols with olefins and with alkyl halides, and many other reactions. It is characteristic of these reactions in liquid sulphur dioxide solution that they proceed smoothly, substituent groups being usually unaffected.

In carrying out the reactions in liquid sulphur dioxide solution, we prefer to dissolve the reactants successively in the liquid sulphur dioxide and then slowly add the catalyst in powdered form or in solution in liquid sulphur dioxide to the solution with stirring. The period for addition of the catalyst may be from a few seconds to thirty minutes, or longer, depending upon the vigor of the reaction. After the catalyst has been added, the solution is stirred as long as necessary, generally five minutes to several hours. When the operation is carried out at temperatures and pressures and under other conditions which permit the loss of any sulphur dioxide through volatilization, it is desirable to provide for adding sufficient liquid sulphur dioxide to the mass in order that the volume may be kept approximately constant.

After the time has elapsed, during which the reaction has progressed to the desired degree, the reaction mixture is poured gradually with stirring into ice-water, and during this operation most of the liquid sulphur dioxide will volatilize. This may be done in suitable vessels and equipment in which the volatility of the sulphur dioxide is increased or accelerated by reducing the pressure or applying a vacuum to the system. Furthermore, the gas may be condensed and recovered for use again in the same or another process. In many cases the nature of the products will permit increasing the temperature of the mass to about room temperature or slightly higher, after the water treatment, to drive off a substantial amount or all of the remaining sulphur dioxide. The separation of the product from the aqueous solution or mass, including the unreacted compounds and catalyst, may be effected by known methods. The above procedure is merely to illustrate a preferred method and this invention is not limited in any sense thereby.

The following examples are given to illustrate the application of our new and improved process to many types of reactions. Other applications will become apparent to one skilled in the art with an understanding of the principles of our invention as carried out in these instances. Again, the invention is not limited to these specific cases:

*Example 1*

Twenty-seven grams of tertiary amyl chloride and 25 grams of benzene were dissolved in 300 milliliters of liquid sulphur dioxide, and 10 grams of anhydrous aluminum chloride added in portions during five minutes. The solution became red, with vigorous ebullition. After stirring for four hours, the mixture was poured into ice-water and heated to 40° C. to drive off the sulphur dioxide. After cooling, the aqueous mixture was extracted with ether. The ether extract was successively washed with water, sodium carbonate solution, and dilute acid, dried, and fractionally distilled, and yielded 17 grams of amyl benzene, B. P. 190°–210° at atmospheric pressure. The yield was 45% of theoretical.

Example 2

Sixty-four grams of naphthalene and 70 grams of diisoamylene were dissolved in 500 milliliters of liquid sulphur dioxide. Seventy-four grams of anhydrous aluminum chloride were added in portions to the solution during ten minutes. After stirring for two hours, the mixture was poured into ice-water and heated to about 50° C. to drive off the sulphur dioxide. After cooling, the aqueous mixture was extracted with ether, and the extract was washed with dilute sodium hydroxide solution and then with dilute acid. After the extract was dried, the ether was distilled off and the residue distilled in vacuo. After a first cut which contained 20 grams of unreacted naphthalene, the second cut, boiling at 130–260° at 6 mm., consisted of 81 grams of mono-, di-, and polyamyl naphthalenes. Yield, 63%.

Example 3

Thirty-five grams of diisoamylene were dissolved in 300 milliliters of liquid sulphur dioxide and 37 grams of anhydrous aluminum chloride added. After stirring for 5 hours, the mixture was poured into ice-water, the major part of the sulphur dioxide evaporated, and the oil was extracted with ether. The ether extract was washed and distilled, giving 14 grams of polyamylenes, B. P. 100–180° at 8 mm. Yield, 40%.

Example 4

Twenty grams of acetyl chloride and 25 grams of benzene were dissolved in 300 milliliters of liquid sulphur dioxide, and 40 grams of anhydrous aluminum chloride added in portions during fifteen minutes. After stirring for four hours, the mixture was poured into ice-water and the aqueous mixture heated to about 40° C. to drive off sulphur dioxide. After extracting with ether, the ether extract was washed and fractionated, giving 14 grams of acetophenone, B. P. 190°–210° at atmospheric pressure. Yield, approximately 45%.

Example 5

Fifteen grams of benzene and 15 grams of benzoyl chloride were dissolved in 75 milliliters of liquid sulphur dioxide, and 15 grams of anhydrous aluminum chloride were added, the solution becoming deep yellow in color. The sulphur dioxide was allowed to boil off, and the residue was allowed to stand overnight. The mixture was poured into ice-water and extracted with ether. The ether extract was washed with dilute acid and then with dilute alkali, dried, and distilled, giving 16.5 grams of benzophenone, B. P. 296° C. Yield, 48%.

Example 6

Thirty-five grams of benzoyl chloride and 32 grams of naphthalene were dissolved in 300 milliliters of liquid sulphur dioxide and 40 grams of anhydrous aluminum chloride added; the first portion produced a brown color which deepened on further addition. After stirring ninety minutes, the mixture was poured into ice-water and extracted with ether. The ether extract was washed successively with dilute alkali and dilute acid, and the ether distilled off on the water bath. The residue, which weighed 47 grams, was distilled in vacuo. The first cut contained 4 grams of naphthalene. The second cut consisted of 30 grams of a viscous yellow liquid, B. P. 208°–212° at 4 mm., which solidified on standing to a white crystalline solid, M. P. 64°–70°. On recrystallization once from alcohol, this material melted at 75.5° C., and was identified as α naphthyl phenylketone. Yield, 52%.

Example 7

Twenty-seven grams of tertiary amyl chloride and 24 grams of phenol were dissolved in 300 milliliters of liquid sulphur dioxide, and 35 grams of anhydrous aluminum chloride were added during five minutes. The yellow color changed slowly to deep green during one hour's stirring. At the end of this time, the mixture was poured into ice-water and heated to 40° to drive off sulphur dioxide. When the ether extract of this aqueous mixture was extracted with 10% sodium hydroxide solution, a white crystalline precipitate formed, presumably being the sodium salt of amyl phenol. The crystalline material was dissolved in hot water and the solution was saturated with carbon dioxide. Twenty grams of crude solid amyl phenol, M. P. 75°–85° separated and was filtered off. One recrystallization from alcohol gave material melting at 92°–94°. Yield, 50%.

Example 8

Thirty-five grams of benzoyl chloride and 24 grams of phenol were dissolved in 300 milliliters of liquid sulphur dioxide, and 40 grams of anhydrous aluminum chloride were added in portions during 10 minutes. The color of the solution remained yellow until the last few grams were added, when the color changed to brown with vigorous ebullition of the sulphur dioxide and separation of crystalline material. The mixture was stirred for 3 hours, and poured into ice-water. After the hydrolysis, the mixture was washed with dilute sodium hydroxide, and 3 grams of benzoic acid were recovered by acidification of the alkaline wash. The neutral ether extract was dried and the ether distilled off on the water bath, leaving 47 grams of colorless liquid phenyl benzoate, which solidified on standing to a white solid, M. P. 68–70°. Yield, 94%.

Example 9

Fourteen grams of resorcinol and 38 grams of benzoyl chloride were dissolved in 300 milliliters of liquid sulphur dioxide, and 40 grams of anhydrous aluminum chloride were added in portions during ten minutes. After stirring 4 hours, hydrolysis gave a yellow solid which was filtered off and washed with 5% sodium hydroxide solution. The alkali-insoluble material consisted of 30 grams of resorcinol dibenzoate, melting at 85°–104°. Recrystallized once from alcohol, the material melted at 115°–116°. Yield, 75%.

Acidification of the alkali washes gave 7 grams of material which was probably largely resorcinol monobenzoate.

Example 10

The procedure of Example 8 was repeated, using 35 grams of benzoyl chloride, 12 grams of phenol, and 40 grams of anhydrous aluminum chloride, with a reaction time of four hours. Treatment of the reaction mixture with water gave a semi-crystalline organic layer. Extraction of the entire mixture with a small amount of ether, followed by a small amount of petroleum ether, left behind a quantity of undissolved crystalline material, which was filtered off. This material weighed 12 grams and was the benzoate of p-hydroxybenzophenone, melting at 109°-113° (M. P. 112°-114° after one recrystallization from alcohol). The ether and petroleum ether extracts were mixed and washed with alkali, and acid. The neutral extract was dried and the ether distilled off on the steam bath, leaving 20 grams of phenyl benzoate, M. P. 49°-56°. Yield, 32% p-benzoyl-phenyl benzoate; 70% of phenyl benzoate.

*Example 11*

Thirteen grams of veratrole and 8 grams of acetyl chloride were dissolved in 150 milliliters of liquid sulphur dioxide, and 10 grams of anhydrous aluminum chloride added. After stirring for two hours, the mixture was poured into ice-water. Extraction with ether gave a yellow ether extract. Washing of the ether extract with sodium carbonate solution removed the yellow color completely, but no trace of phenolic material could be detected in the carbonate wash. The colorless neutral ether extract was dried and the ether distilled off on the water bath. Remaining behind were 14 grams of colorless oil which solidified on standing to a white solid, M. P. 49°-50°, being acetoveratrone (3,4-dimethoxyacetophenone). Yield, 82%.

In most cases, it will be found advantageous to carry out these reactions in apparatus suitably equipped with stirrers or agitators, valves, pressure gauges, jacketed autoclaves, etc., in which the pressure may be varied as desired, and to which artificial heating or cooling means, such as steam or cooling water, may be applied (the steam or cooling water will usually be circulated through the jacket of the autoclave in indirect contact with the solution of reactants) in order that temperature control may be assisted.

As hereinbefore mentioned, the concentration of either of the reactants (or any one where more than two are involved), or of the catalyst or mixture of catalysts in solution in liquid sulphur dioxide may be varied to accomplish desired results. For instance, where the reaction between two organic compounds would ordinarily be violent, the concentration of one or both may be made very low, or the quantity of catalyst added thereto may be gradual by using a very dilute solution thereof.

The terms "halide catalyst," "metal halides," and "metallic halides" and the like appearing in the specification and claims are intended to mean those compounds which will catalyze a reaction of the Friedel-Crafts type as well as the other type reactions which are referred to in this specification.

We claim:

1. The process of reacting organic compounds which comprises bringing organic reactants into intimate relationship in the presence of a Friedel-Crafts halide catalyst while dissolved or finely dispersed in liquid sulphur dioxide.

2. The process of preparing organic compounds by the interaction of organic reactants in the presence of a metallic halide catalyst which comprises bringing the reactants into intimate reacting relationship while at least one of them is dissolved in liquid sulphur dioxide.

3. The process of preparing organic compounds which comprises reacting organic compounds in the presence of a Friedel-Crafts halide catalyst while at least one of the reactants is dissolved in liquid sulphur dioxide.

4. The process of preparing organic compounds which comprises dissolving organic reactants in liquid sulphur dioxide and adding thereto a metal halide catalyst.

5. The process of preparing organic compounds which comprises dissolving organic reactants and a metal halide catalyst in separate portions of liquid sulphur dioxide and combining the solutions in a regulated manner and under controlled conditions of temperature and pressure.

6. The process of claim 1 in which the Friedel-Crafts halide catalyst contains more than one halogen atom to the molecule.

7. A process of alkylating aromatic compounds which comprises reacting an aliphatic halide with an aromatic compound in the presence of a metal halide catalyst while at least one of the reactants is dissolved in liquid sulphur dioxide.

8. A process of alkylating aromatic compounds which comprises reacting an aliphatic halide with an aromatic compound in the presence of a metal halide catalyst which contains more than one halogen atom in the molecule while the reactants are dissolved in liquid sulphur dioxide.

9. The process of preparing alkylated aromatic compounds which comprises reacting an aromatic compound and a compound selected from the group consisting of alkyl halides, aralkyl halides, and olefins in the presence of a halide catalyst while dissolved in liquid sulphur dioxide.

10. The process of preparing ketones which comprises reacting an aromatic compound with a compound selected from the group consisting of organic carboxylic halides in the presence of a Friedel-Crafts halide catalyst while the reactants are dissolved in liquid sulphur dioxide.

11. The process of preparing organic compounds which comprises reacting organic compounds in the presence of a Friedel-Crafts catalyst while at least one of the reactants is dissolved in liquid sulphur dioxide.

JOHN ROSS.
ROBERT LOUIS BRANDT.
JOSEPH HENRY PERCY.